United States Patent [19]

Sakuramoto et al.

[11] Patent Number: 4,830,819

[45] Date of Patent: May 16, 1989

[54] COMPOSITION FOR FIXING METAL POWDER MOLDING AT SINTERING

[75] Inventors: Takahumi Sakuramoto; Makoto Kojima; Eishi Asoshina; Takashi Tominaga, all of Osaka, Japan

[73] Assignee: Nitto Denko Corporation, Osaka, Japan

[21] Appl. No.: 892,459

[22] Filed: Aug. 4, 1986

Related U.S. Application Data

[63] Continuation of Ser. No. 728,898, Apr. 30, 1985.

[30] Foreign Application Priority Data

Apr. 30, 1984 [JP] Japan ................................ 59-86964
Apr. 30, 1984 [JP] Japan ................................ 59-86965
Apr. 30, 1984 [JP] Japan ................................ 59-86966

[51] Int. Cl.[4] ............................ B22F 7/04; C09J 3/14; C09J 3/16
[52] U.S. Cl. ............................................ 419/8; 419/9; 419/43; 156/331.1; 156/331.2; 156/331.8; 156/331.9
[58] Field of Search ..................... 528/352, 353; 419/8, 419/9, 43, 57, 65; 156/331.1, 331.9, 331.8, 331.2

[56] References Cited

U.S. PATENT DOCUMENTS

| 3,673,145 | 6/1972 | Minami et al. | 264/298 |
| 3,939,029 | 2/1976 | Gilliam et al. | |
| 4,121,928 | 10/1978 | Mori | 419/43 |
| 4,183,839 | 1/1980 | Gagliani | |
| 4,358,419 | 11/1982 | Byrne et al. | 419/10 |
| 4,512,855 | 4/1985 | Mazur | 427/256 |
| 4,596,692 | 6/1986 | Morishita et al. | 419/43 |
| 4,681,733 | 7/1987 | Konishi et al. | 419/43 |
| 4,692,387 | 9/1987 | Reich | 419/10 |

FOREIGN PATENT DOCUMENTS 1444421 10/1973 United Kingdom .

OTHER PUBLICATIONS

IBM Technical Disclosure Bulletin, vol. 22, No. 6, Nov. 1979, p. 2444, J. Duran, "Copolymer For Direct Bonding in Single or Multi-Level Applications".

Primary Examiner—Stephen J. Lechert, Jr.
Assistant Examiner—Eric Jorgensen
Attorney, Agent, or Firm—Sughrue, Mion, Zinn, Macpeak and Seas

[57] ABSTRACT

A composition for fixing a metal powder molding at sintering, which is used, in the case of disposing a metal powder molding formed by rolling a mixture of a metal powder and a synthetic resin-based binder on a metal base material and sintering the metal powder molding in a non-oxidizing atmosphere, to adhere and fix the metal powder molding onto the base material until the metal powder molding is sintered interposing between the metal powder molding and the base material, comprising a polyimide liquid composition containing a polyimide precursor and an organic solvent as the essential components.

4 Claims, No Drawings

COMPOSITION FOR FIXING METAL POWDER MOLDING AT SINTERING

This is a continuation, of application Ser. No. 728,898, filed 4/30/85.

FIELD OF THE INVENTION

This invention relates to a method for sintering which is used in the case of forming a metal layer on the surface of a metal base material for improving the abrasion resistance of the base material surface by disposing a sheet-like material or an analogous article thereof formed by rolling a mixture of the metal powder and a synthetic resin-based binder on the metal base material followed by sintering.

BACKGROUND OF THE INVENTION

When a metal powder sheet formed by rolling a mixture of the metal powder and a binder is placed on a metal base material and sintered for forming the metal layer thereon, the binder in the metal powder sheet, even if the binder has originally an adhesive action, is burned and volatilized off in the temperature raising stage for sintering to lose the adhesive function, whereby the adhesion between the metal powder sheet and the base material is lost. Thus, when the weight of the metal powder sheet acts on the adhesion face with the base material as the case of bonding the metal powder sheet to a slanting surface or a curved surface of the base material or a downward surface of the base material, the adhesive force of the binder cannot support the weight of the metal powder sheet, whereby the metal powder sheet peels off or falls from the base material. In particular, in the case of performing the sintering treatment of the metal powder sheet, which suffers vibration or impact during conveying in a furnace such as a meshbelt type or pusher type continuous sintering furnace, a vacuum sintering furnace, etc., the metal powder sheet tends to peel off or fall due to the vibration or impact.

As an effective method for overcoming the above-described problem, the inventors already proposed a method of preventing the occurrence of peeling off or falling of the metal powder sheet even in the case of bonding the sheet to a metal base material in the specific state as described above and performing the sintering treatment as applying vibration or impact to the metal powder sheet by interposing a specific composition between the metal powder sheet and the metal base material in the case of disposing the sheet on the base material to assist the adhesion or fixing of the sheet to the base material until the metal powder sheet is sintered (Japanese Patent Application No. 34887/84, corresponding to U.S. Pat. application Ser. No. 705,264, filed Feb. 25, 1985).

However, since the composition used in the previously proposed method is mainly composed of a (meth)acrylic acid alkyl ester polymer, a specific sintering operation that the sintering system is maintained at 250° to 380° C. for a definite period of time in the initial stage of temperature raising is required and the desired effect cannot be attained without employing such a specific operation. Such a sintering operation is not always practical and is somewhat lacking in general industrial utilization.

Also, when a metal powder sheet is placed on a metal base material and sintered, there is a problem that this kind of sheet shrinks about 20% in the plane directions at sintering and hence it is usually necessary to employ the dimensions of the metal powder sheet estimating the shrinkage so that the definite dimensions can be obtained after sintering. However, such a selection of dimensions of the sheet is very troublesome and is lacking in practicality. Further, the occurrence of deviation of shrinkage percentage by the scattering in the thickness of the metal powder sheets or the mixing ratio of a metal powder and a binder is unavoidable, which causes a difficulty that it is difficult to make the dimensions of the sheet after sintering in the definite dimensions. This difficulty becomes more serious for a larger size of the sheet since the deviation of the shrinkage percentage becomes larger.

Accordingly, it is very convenient if the occurrence of such a shrinkage of the sheet can be restrained by interposing a composition as described above but such a shrinkage restricting function cannot be expected by the above-described composition.

SUMMARY OF THE INVENTION

As a result of various investigations from the above-described viewpoints, the inventors have succeeded to attain the present invention.

Accordingly, an object of this invention is to provide a method for sintering a metal powder molding which comprises disposing the metal powder molding which is formed by rolling a mixture of a metal powder and a synthetic resin-based binder, on a metal base material, and sintering the metal powder molding in a non-oxidizing atmosphere, wherein a polyimide liquid composition containing a polyimide precursor and an organic solvent as essential components is interposed between the metal powder molding and the metal base material to adhere and fix the metal powder molding on the metal base material until sintering the metal powder molding.

DETAILED DESCRIPTION OF THE INVENTION

When the composition of this invention is interposed between a metal powder molding and a metal base material and the metal powder molding is subjected to a sintering treatment by a constant temperature raising rate, after first evaporating off the solvent in the initial temperature raising stage of from about 120° to 250° C., a hardening reaction (imidation reaction) of the polyimide precursor occurs to increase the adhesive force of the composition and assist the adhesion and fixing of the metal powder molding onto the base material, and further in the subsequent temperature raising stage, gaseous thermal decomposition products are released to form a carbon precursor, which exhibits the function of assisting the adhesion and fixing of the molding onto the base material in a temperature range of usually about 700° C. at which the metal powder molding begins to sinter. Therefore, even when the metal powder molding is placed on a slanting surface or a curved surface of the base material or is stuck to the downward surface of the base material, and the metal powder molding disposed on the base material is subjected to a sintering treatment in a state of applying vibration or impact to the molding during conveying in a sintering furnace, the use of the composition of this invention does not cause the problems of peeling off or falling of the metal powder molding during the sintering treatment.

Moreover, since a polyimide resin is used for the composition of this invention, the amount of residual carbon after completion of the sintering occupies a considerable rate of about 10 to 60% by weight, which gives a very good result for the adhesion and the fixing force of the metal powder molding to the base material during the sintering treatment to effectively restrain the occurrence of the shrinkage of the metal powder molding in the plane directions during the sintering treatment, whereby a metal layer causing shrinkage in the thickness direction only and having an excellent areal dimensional stability, i.e., having the substantially same areal size as the original one is formed.

Thus, by interposing the fixing composition of this invention between the metal powder molding and a metal base material, a metal layer having an excellent dimensional stability, which is strongly fixed on the metal base material by bonding of the metals each other of the base metal material and the metal powder, can be formed on the base material without the specific sintering operation as required in the previous proposal, i.e., by applying a conventional sintering treatment which employs a constant temperature raising rate, without the problem of peeling off or falling of the metal powder molding during the sintering treatment and substantially without the occurrence of the shrinkage of the metal powder molding in the plane directions during the sintering treatment.

The polyimide precursor used in this invention can be obtained by the reaction of a tetracarboxylic dianhydride or a derivative thereof (for example, a lower alkyl ester or a halide of tetracarboxylic acid) and an organic diamine in an organic solvent.

That is, a polyamide acid (or the lower alkyl ester or the halide thereof) can be obtained by reacting both the components at usually from about 0° to 100° C., preferably from 5° to 40° C., more preferably at about room temperature. Also, if necessary, the reaction product may be further heated to usually the temperatures of from 80° C. to the boiling point of the solvent used, preferably the temperature of from 100° to 200° C., to form a partial imidation product.

It is preferred that the imidation of the above-described partial imidation product is performed to an extent of not retarding the solubility thereof in the organic solvent. In general, it is preferred that the unit number ratio of the structural unit of amic acid (or the lower alkyl ester or the halide thereof) to the structural unit of imide is in the range of usually from about 0.03 to 4, preferably from 0.05 to 1. This ratio can be known by measuring the acid value of the reaction product.

The tetracarboxylic dianhydride used in this invention includes an aliphatic one and an aromatic one.

Examples of the aliphatic tetracarboxylic dianhydride are butane-tetracarboxylic dianhydride, pentane-tetracarboxylic dianhydride, hexane-tetracarboxylic dianhydride, cyclopentane-tetracarboxylic dianhydride, bicyclohexene-tetracarboxylic dianhydride, etc.; 5-(2,5-dioxotetrahydrofuryl)-3-methyl-3-cyclohexene1,2-tetracarboxylic dianhydride; bicyclo-(2,2,2)-octene2,3,5,6-tetracarboxylic dianhydride, etc. As the matter of course, these tetracarboxylic dianhydrides may be substituted with a substituent such as an alkyl group, etc., at the skeleton thereof.

Examples of the aromatic tetracarboxylic dianhydride are pyromellitic dianhydride, 3,3',4,4'-benzophenonetetracarboxylic dianhydride, 3,3',4,4'-biphenyltetracarboxylic dianhydride, benzene-1,2,3,4-tetracarboxylic dianhydride, etc. These aromatic tetracarboxylic dianhydrides may have a substituent such as an alkyl group, etc., at the aromatic ring.

In this invention, at least one of the aliphatic tetracarboxylic dianhydrides and aromatic tetracarboxylic dianhydrides is used. Also, in addition to these dianhydrides, a tetracarboxylic acid or a lower alkyl ester or halide thereof can be used. In addition, a dicarboxylic acid, a tricarboxylic acid, or the anhydrides thereof may be used together with the above-described tetracarboxylic acid component, but it is preferred in this case that the amount of the additional component be 30 mole % or less of the total amount of the additional component and the tetracarboxylic acid component.

The organic diamine which is reacted with the tetracarboxylic dianhydride or the derivative thereof is a diamine represented by the formula $H_2N-R-NH_2$, wherein R represents a divalent organic group such as an aromatic group, an aliphatic group, an alicyclic, group, a heterocyclic group, etc., or a combination thereof, or further the above-described groups to which oxygen, nitrogen, sulfur, phosphorus, silicon, etc., is bonded. In this case, R may have a substituent which does not quantitatively react with an amino group or an acid anhydride group under a reaction condition. Such a group can impart preferred properties such as a solubility, workability, and adhesive property of the polyimide precursor produced.

An organic triamine or organic tetramine which is conventionally used may be used together with the organic diamine. In this case, it is preferred that the amount of the addition component is about 20 mole % or less of the total amount of the additional component and the organic diamine.

An aromatic diamine is preferred as the organic diamine in this invention. Specific examples of the diamines which can be used in this invention are meta-phenylenediamine, p-phenylenediamine, 4,4'-diaminodiphenylpropane, 4,4'-diaminodiphenylethane, 4,4'-diaminodiphenylmethane, benzidine, 4,4'-diaminodiphenyl sulfide, 4,4'-diaminodiphenyl sulfone, 3,3'-diaminodiphenyl sulfone, p-bis(4-aminophenoxy)-benzene, meta-bis(4-aminophenoxy)benzene, 4,4'-diaminodiphenyl ether, 1,5-diaminonaphthalene, 3,3'-dimethyl-4,4'-diaminobiphenyl, 3,4'-diaminobenzanilide, 4-(p-aminophenoxy)-4-aminobenzanilide, 3,4'-diaminodiphenyl ether, 3,3'-dimethoxybenzene, 2,4-bis(β-amino-tert-butyl)toluene, bis(p-β-amino-tert-butylphenyl) ether, metaxylylenediamine, p-xylylenediamine, di(p-amino-cyclohexyl)methane, hexamethylenediamine, heptamethylenediamine, octamethylenediamine, nonamethylenediamine, 4,4-dimethylheptamethylenediamine, 3-methoxy-heptamethylenediamine, 2,11-diamiododecane, 1,4-diaminocyclohexane, 2,2'-diaminodiethyl ether, 2,2'-diaminodiethyl thioether, 3,3'-diaminodipropoxyethane, 2,6-diaminopyridine, guanamine, 2,5-diamino-1,3,4-oxadiazole, 2-(3'-aminophenyl)-5-aminobenzoxazole, bis(4-aminophenol)phosphine oxide, bis(4-aminophenyl)diethylsilane, etc. Those diamines can be used alone or as mixtures thereof.

The reaction of the tetracarboxylic dianhydride or a derivative thereof and the organic amine in this invention is usually performed in an organic solvent as described above. The reaction of obtaining the polyamide acid (or the lower alkyl ester or the halide thereof) is an exothermic reaction and the reaction temperature can be controlled by employing a suitable cooling means at the reaction. In this case, it is preferred that one of both components is added to an organic solvent and then another component is added thereto with proper amount. If the reaction can be sufficiently controlled, both components may be added simultaneously.

After the formation of the polyamide acid, if necessary, an imide ring opening reaction may further proceed under a severe condition of about 80° C. or higher as described above and a desired partial imidation product can be obtained by measuring the acid value of the reaction product. By adjusting the molar ratio of both components to 1:1 in the synthetic reaction for the precursor, the product having the highest molecular weight can be obtained.

Examples of the organic solvent used in the reaction are N,N-dimethylformamide, N,N-diethylformamide, N,N-dimethylacetamide, N-methyl-2-pyrrolidone, N-methyl-caprolactam, dimethyl sulfoxide, tetramethylenesulfone, tetramethylurea, hexamethyl phosphamide, pyridine, quinoline, γ-butyrolactone, N-acetyl-2-pyrrolidone, phenols, cresols, nitro compounds, glycols, cellosolves, carbitols, etc. The amount of the organic solvent is from about 20 to 95% by weight of the reaction system and the amount thereof may be selected in the above-described range to provide a concentration showing a practical viscosity.

In addition, in the case of obtaining a partial imidation produce by sufficiently proceeding the imidation in the above-described synthesis of the polyimide precursor, a solvent having a relatively high boiling point is selected to perform a desired imidation and, if necessary, the product can be reprecipitated in a poor solvent, dried, and redissolved in other solvent having a low boiling point and the epoxy resin is then added thereto.

This invention further includes the following embodiments.

To a solution composed of the above-described polyimide precursor and the organic solvent, an epoxy compound having at least two epoxy groups in one molecule is compounded so that the epoxy group becomes 0.3 equivalent or higher per 1 equivalent of the acid group (carboxy group) of the polyimide precursor. In the case of using such an epoxy compound, it is preferred that the tetracarboxylic dianhydride for obtaining the above-described polyimide precursor is an aliphatic tetracarboxylic dianhydride alone or a mixture of from about 10 to 90 mole % aliphatic tetracarboxylic dianhydride and from about 90 to 10 mole % aromatic tetracarboxylic dianhydride.

When the fixing composition of this invention further containing the epoxy compound is interposed between the metal powder molding and the metal base material and the sintering treatment is performed at a constant temperature raising rate, the solvent is evaporated off in an initial temperature raising stage of usually from about 120° to 250° C. and then a hardening reaction of the polyimide precursor and the epoxy compound occurs to increase the adhesive force and assist the adhesion and fixing of the metal powder molding onto the base material, and thus peeling off or falling of the metal powder molding does not occur during the sintering treatment.

Also, when a polyamide acid or polyamic acidimide which is the precursor for a polyimide resin is used individually, it causes an intramolecular ring closing reaction (imidation reaction) at the initial stage of the sintering treatment and is hardened, and there may be a possibility that free water formed in this case reduces the adhesive and fixing force but since the epoxy resin is used with the polyimide precursor, the above-described problem can be avoided.

That is, the epoxy compound has a function of hardening the precursor to cause cross-linking by reacting with the acid group (carboxy group) contained in the polyimide precursor in the initial stage of the sintering treatment, whereby the formation of free water can be minimized as low as possible. Moreover, the epoxy compound contributes to the improvement of the adhesive force in the case of temporarily adhering the metal powder molding to the base material and gives good results in the sintering operation.

The fixing composition at sintering of this invention is composed of a polyimide liquid composition containing the polyimide precursor obtained by the manner described above, the organic solvent, and, if necessary, the epoxy compound as described above. The fixing composition may further contain, if necessary, a xylene resin, paraffin wax, a process oil, abietyl alcohol, etc., as a softener; calcium carbonate, silica, talc, etc., as a filler; and dioctyl phthalate, dioctyl adipate, triphenyl phosphate, dibutyl phthalate, etc., as a plasticizer.

When the above-described composition composed of the components described above is interposed between a metal powder molding and a metal base material and the sintering treatment is performed, the amount of the residual carbon after the completion of sintering is as high as about 10 to 60% by weight, which increases the adhesive and fixing force of the metal powder molding during high temperature heating and gives good results for restraining the occurrence of heat shrinkage of the metal powder molding.

Then, the method of using the fixing composition at sintering of this invnention is explained. First, in the case of disposing a metal powder molding formed by rolling a mixture of a metal powder and a synthetic resin-based binder on a metal base material, the fixing composition of this invention is interposed between the base material and the metal powder molding. The interposition of the composition is performed by coating at least one of the base material and the metal powder molding with the composition.

It is better that the thickness of the composition interposed between those two members is generally from about 5 to 50 μm, preferably from about 10 to 30 μm. If the thickness is too thin, the effect of this invention cannot be obtained, and if the thickness is too thick, the generation of gases at the interface between the base material and the molding becomes large to reduce the fixing force of both members at sintering or the bonding strength of them after sintering.

The metal powder molding used in the above method is formed by rolling a mixture of a metal powder and a synthetic resin-based binder into a sheet-like material or the like and the thickness of the sheet-like molding is usually from about 0.5 to 5 mm.

As the metal powder, various metal powders such as a self-melting alloy powder, abrasion resisting alloy powder, etc., can be used according to the desired property to be imparted to the surface of a metal base material. The representative example of the metal powder is an Fe—M—C system eutectic alloy powder which is an abrasion resisting alloy powder, wherein M contains at least one of Mo, B and P as the main component and may further contain a secondary element such as Cr, V, W. Nb, Ta and Ti. Also, M further contains Si, Ni or Mn as other element. The sintering temperature of the eutectic alloy powder is relatively low, the liquid phase thereof becomes from about 10 to 50% by volume at a temperature range of from about 1,000° to 1,150° C. and the liquid phase has a feature that the phase shows excellent wettability for the base material.

In addition, it is preferred that the particle size of the alloy powder is generally about 50 Tyler mesh or less since the particle size of the powder influences on the porosity after sintering. If the particle size is larger than the above value, it becomes difficult to form an alloy layer having a high density.

As the synthetic resin-based binder to be mixed with the above-described metal powder, a synthetic resin having a pressure-sensitive adhesive property is preferred. In particular, an acrylic polymer or copolymer composed of a (meth)acrylic alkyl ester or composed of the ester and a monomer copolymerizable with the ester and an acrylic pressure-sensitive adhesive composition composed of the acrylic polymer or copolymer added with an adhesive property imparting resin such as an alkylphenolic resin, a rosin resin, a petroleum resin, a cumarone series resin, etc., are preferably used.

The synthetic resin-based binder is diluted with a proper organic solvent such as acetone, toluene, methyl ethyl ketone, etc., the solution is kneaded with from about 10 to 100 parts by weight of the metal powder per 1 part by weight of the solid component thereof, the kneaded mixture is poured on a frame having thereon a mold release paper and after evaporating the solvent, the mixture is molded into a sheet-like form or the like by passing it through molding rolls to provide a desired metal powder molding.

The metal powder molding is placed on a metal base material with the fixing composition of this invention interposed between them as described above and is sintered in a non-oxidizing atmosphere. In this case, the temperature raising rate may be constant and it is unnecessary to maintain the system for a definite period of time at a lower temperature side at sintering as the previous proposal. In the initial temperature raising stage, the solvent in the composition is first evaporated off, then the composition shows a strong adhesive force by the hardening reaction of the polyimide precursor and the polyimide precursor is then converted into a carbon precursor which effectively contributes to the adhesion, which then stably adheres and fixes the molding onto the base material until the temperature of the system reaches the sintering temperature.

In addition, the reason for performing the sintering treatment in a non-oxidizing atmosphere is that if the sintering treatment is performed in an oxidizing atmosphere, the metal powder molding is deteriorated by oxidation during the treatment and a desired metal layer cannot be formed. As the nonoxidizing atmosphere, a hydrogen gas atmosphere and a nitrogen gas atmosphere as well as vacuum may be employed.

When the assembly is maintained at a sintering temperature for a definite period of time, the carbon precursor is finally completely carbonized. In this case, the amount of residual carbon is from about 10 to 60%, preferably from 15 to 40% by weight. Also, similar materials in the metal powder molding are carbonized and vanished and, on the other hand, the metal component in the molding diffuses in the base material, whereby a metal layer having a good dimensional stability showing a similar dimensions to the original dimensions are strongly bonded to the base material is formed.

The invention is explained in more detail by reference to the following examples. Unless otherwise indicated, all parts and percentages are by weight.

EXAMPLE 1

In a 500 cc four-necked flask equipped with a thermometer, an $N_2$ gas inlet, a condenser having a trap, and a stirrer were placed 43.6 g (0.2 mole) of pyromellitic dianhydride and 380.8 g of N-methylpyrrolidone, and the mixture was stirred on an ice bath while passing therethrough a dry $N_2$ gas. When the temperature of the content was reached at about 5° C., 40.0 g (0.2 mole) of 4,4'-diaminodiphenyl ether was added thereto little by little while checking the extent of heat generation. It required about 30 minutes for the addition and the temperature of the reactants increased to 15° C.

After the addition of the ether, the ice bath was removed and the reaction mixture was stirred for about 2 hours at room temperature to provide a viscous polyamide acid solution having an acid value of 0.870 milliequivalent/g as the fixing composition at sintering of this invention. In addition, the amount of residual carbon when the composition was subjected to a carbonization treatment under the same condition as the sintering treatment described hereinafter was 35%.

On the other hand, after wet-kneading 48.5% of an eutectic alloy powder composed of 10.5% Mo, 2.5% Cr, 2.4% P, and 3.6% C, rest being Fe and having a particle size of 150 Tyler mesh or less; 48.5% of a SUS 410 powder having a particle size of 150 Tyler mesh or less; and further 3% of a (meth)acrylic acid alkyl ester resin using acetone as a solvent, the kneaded mixture was rolled to form an alloy powder sheet having a thickness of 2 mm and a density of 4.8 g/cm$^3$.

The sheet thus prepared was cut into a size of 1 cm$\times$1 cm and after coating the sheet with the above-described fixing composition at a thickness of 30 $\mu$m, the sheet was stuck to a vertical surface of a steel base material. Thereafter, the temperature of the system was increased to 1,090° C. at a temperature raising rate of 15° C./min. in a hydrogen gas atmosphere and after maintaining the system at the temperature for 20 minutes, the system was gradually cooled.

Thus, an abrasion resisting alloy layer having a thickness of 1.25 to 1.3 mm, a hardness of 62 to 65 in HRC, and a density of 7.6 to 7.75 g/cm$^3$ and strongly bonded to the steel base material could be formed without the occurrence of falling of the alloy powder sheet and the shrinkage of the sheet in the plane directions during the sintering treatment.

EXAMPLE 2

In the same type of the flask as used in Example 1 were placed 39.6 g (0.2 mole) of 1,2,3,4-butanetetracarboxylic dianhydride and 185.7 g of N-methyl-2-pyrrolidone and then 40.0 g (0.2 mole) of 4,4'-diaminodiphenyl ether was added to the mixture while passing therethrough a dry $N_2$ gas by the same manner as in Example 1.

Thereafter, the ice bath was removed, the reaction mixture was stirred for about 2 hours at room temperature to provide a polyamic acid solution having an acid value of 1.532 milliequivalent/g as a fixing composition of this invention. The amount of residual carbon when the composition was subjected to a carbonization treatment under the same condition as the subsequent sintering treatment was 30%.

On the other hand, after wet-kneading 58.8% of the eutectic alloy powder having the same composition as used in Example 1, 39.2% of a SUS 410 powder having a particle size of 150 Tyler mesh or less, and 2% of a (meth)acrylic acid alkyl ester resin using toluene as a solvent, the kneaded mixture was rolled to form an alloy powder sheet having a thickness of 1 mm and a density of 4.65 g/cm$^3$.

The sheet thus formed was cut into a size of 1 cm×1 cm and after coating the sheet with the above-described fixing composition in a thickness of 20 μm, the sheet was stuck to a vertical surface of a steel base material. Thereafter, the temperature of the system was increased to 1,080° C. at a rate of 20° C./min. in a hydrogen gas atmosphere and after maintaining the system at the temperature for 15 minutes, the system was gradually cooled.

Thus, an abrasion resisting alloy layer having a thickness of 0.65 to 0.7 mm, a hardness of 61 to 63 in HRC, and a density of 7.6 to 7.7 g/cm$^3$ and strongly bonded to the steel base material could be formed without the occurrence of falling of the alloy powder sheet and the shrinkage of the sheet in the plane directions during the sintering treatment.

EXAMPLE 3

In the same type of the flask as used in Example 1 were placed 39.6 g (0.2 mole) of 1,2,3,4-butanetetracarboxylic dianhydride and 185.7 g of N,N-dimethylformamide, and the mixture was stirred on an ice bath while passing therethrough a dry $N_2$ gas. When the temperature of the content reached about 5° C., 40.0 g (0.2 mole) of 4,4'-diaminodiphenyl ether was added thereto little by little while checking the extent of heat generation. It required about 30 minutes for the addition and the temperature of the reactants increased to 15° C.

Thereafter, the ice bath was removed and the flask was heated using a heater. The mixture was stirred for about 2 hours at 120° C. to provide a polyamic acid solution having an acid value of 0.450 milliequivalent/g (residual percentage of acid value: 14.9%). A fixing composition of this invention was obtained by compounding 100 g of the solution thus formed with 8.5 g of a bisphenol A type liquid epoxy resin (epoxy equivalent: 184 to 194) as an epoxy compound. The amount of residual carbon when the composition was subjected to a carbonization treatment under the same condition as the subsequent sintering treatment was 22%.

On the other hand, after wet-kneading 48.5% of the eutectic alloy powder having the same composition as the alloy powder used in Example 1, 48.5% of a SUS 410 powder having a particle size of 150 Tyler mesh or less, and 3% of a (meth)acrylic acid alkyl ester resin using acetone as a solvent, the kneaded mixture was rolled to form an alloy powder sheet having a thickness of 2 mm and a density of 4.8 g/cm$^3$.

The sheet was cut into a size of 1 cm×1 cm, and after coating the sheet with the above-described fixing composition at a thickness of 20 μm, the sheet was stuck to a vertical surface of a steel base material. Thereafter, the temperature of the system was increased to 1,090° C. at a rate of 15° C./min. in a hydrogen gas atmosphere and after maintaining the system at the temperature for 20 minutes, the system was gradually cooled.

Thus, an abrasion resisting alloy powder layer having a thickness of 1.35 to 1.4 mm, a hardness of 62 to 65 in HRC, and a density of 7.6 to 7.75 g/cm$^3$ and strongly bonded to the steel base material could be formed without troubles on the sheet during the treatment.

EXAMPLE 4

In the same type of the flask as used in Example 1 were placed 39.6 g (0.2 mole) of 1,2,3,4-butanetetracarboxylic dianhydride and 85.7 g of N,N-dimethylformamide, and 39.6 g (0.2 mole) of 4,4'-diaminodiphenylmethane was then added thereto while passing therethrough a dry $N_2$ gas by the same manner as Example 1.

Thereafter, the ice bath was removed and the mixture was stirred for 2 hours at room temperature to provide a polyamic acid solution having an acid value of 1.534 milliequivalent/g. A fixing composition of this invention was obtained by compounding 100 g of the solution thus formed with 30 g of tricresyl isocyanurate as an epoxy compound. The amount of residual carbon when the composition was subjected to a carbonization treatment under the same condition as the subsequent sintering treatment was 25%.

On the other hand, after wet-kneading 38.6% of the eutectic alloy powder having the same condition as the alloy powder used in Example 1, 57.9% of a SUS 410 powder having a particle size of 150 Tyler mesh or less, and 3.5% of a (meth)acrylic acid alkyl ester resin using toluene as a solvent, the kneaded mixture was rolled to form an alloy powder sheet having a thickness of 1.5 mm and a density of 4.8 g/cm$^3$.

The sheet thus formed was cut into a size of 1 cm×1 cm and after coating the sheet with the above-described fixing composition in a thickness of 20 μm, the sheet was stuck to a vertical surface of a steel base material. Thereafter, the temperature of the system was increased to 1,100° C. at a rate of 10° C./min. and after maintaining the system at the temperature for 20 minutes, the system was gradually cooled.

Thus, an abrasion resisting alloy layer having a thickness of 0.9 to 0.95 mm, a hardness of 60 to 62 in HRC, and a density of 7.5 to 7.7 g/cm$^3$ and strongly bonded to the steel base material could be formed without the occurrence of falling of the alloy powder sheet and the shrinkage thereof in the plane directions during the sintering treatment.

EXAMPLE 5

In the same type of the flask as used in Example 1 were placed 19.8 g (0.1 mole) of 1,2,3,4-butanetetracarboxylic dianhydride, 32.2 g (0.1 mole) of 3,3',4,4'-benzophenonetetracarboxylic dianhydride, and 368 g of N,N-dimethylformamide, and the mixture was stirred on an ice bath while passing therethrough a dry $N_2$ gas. When the temperature of the content reached about 5° C., 40.0 g (0.2 mole) of 4,4'-diaminodiphenyl ether was added thereto little by little while checking the extent of heat generation. It is required about 30 minutes for the addition and the temperature of the reactants was increased to 15° C.

Thereafter, the ice bath was removed and the mixture was stirred for about 2 hours at room temperature to provide a viscous polyamic acid solution having an acid value of 0.88 milliequivalent/g. A fixing composition of this invention was obtained by compounding 100 g of the solution thus formed with 14.8 g of a bisphenol A type liquid epoxy resin (epoxy equivalent: 184 to 194) as an epoxy compound. The amount of residual carbon when the composition was subjected to a carbonization treatment under the same condition as the subsequent sintering treatment was 25%.

On the other hand, after wet-kneading 58.8% of the eutectic alloy powder having the same composition as the alloy powder used in Example 1, 39.2 g of a SUS 410 powder having a particle size of 150 Tyler mesh or less, and 2% of a (meth)acrylic acid alkyl ester resin using acetone as a solvent, the kneaded mixture was rolled to form an alloy powder sheet having a thickness of 1 mm and a density of 4.65 g/cm$^3$.

The sheet thus formed was cut into a size of 1 cm × 1 cm and after coating the sheet with the abovedescribed fixing composition in a thickness of 20 μm, the sheet was stuck to a vertical surface of a steel base material. Thereafter, the temperature of the system was increased to 1,080° C. at a rate of 20° C./min. in a hydrogen gas atmosphere and after maintaining the system at the temperature for 15 minutes, the system was gradually cooled.

Thus, a abrasion resisting alloy layer having a thickness of 0.62 to 0.65 mm, a hardness of 61 to 63 in HRC, and a density of 7.6 to 7.7 g/cm$^3$ and strongly bonded to the steel base material could be formed without the occurrence of falling of the alloy powder sheet and the shrinkage thereof in the plane directions during the sintering treatment could be formed.

EXAMPLE 6

In the same type of the flask as used in Example 1 were placed 19.8 g (0.1 mole) of 1,2,3,4-butanetetracaroxylic dianhydride, 32.2 g (0.1 mole) of 3,3',4,4'-benzophenonetetracarboxylic dianhydride, and 368 g of N,N-dimethylformamide, and 39.6 g (0.2 mole) of 4,4'-diaminodiphenylmethane was then added to the mixture while passing therethrough a dry N$_2$ gas by the same manner as in Example 1. Also, the flask was heated using a heater. After stirring the mixture for about 2 hours at 120° C., the mixture was cooled to provide a polyamic acid-imide solution in a slightly white turbid state.

Then, a fixing composition of this invention was obtained by compounding 100 g of the solution thus formed with 20 g of triglycidyl isocyanurate. The amount of residual carbon when the composition was subjected to a carbonization treatment under the same condition as the subquent sintering treatment was 28%.

On the other hand, after wet-kneading 38.6% of the eutectic alloy powder having the same operation as the alloy powder used in Example 1, 57.9% of a SUS 410 powder having a particle size of 150 Tyler mesh or less and 3.5% of a (meth)acrylic acid alkyl ester resin using tolunene as a solvent, the kneaded mixture was rolled to provide an alloy powder sheet having a thickness of 1.5 mm and a density of 4.8 g/cm$^3$.

The sheet thus formed was cut into a size of 1 cm × 1 cm and after coating the sheet with the above-described fixing composition in a thickness of 20 μm, the sheet was stuck to a vertical surface of a steel base material. Thereafter, the temperature of the system was increased to 1,100° C. at a rate of 10° C./min. in a hydrogen gas atmosphere and after maintaining the system at the temperature for 20 minutes, the system was gradually cooled.

Thus, an abrasion resisting alloy layer having a thickness of 0.9 to 0.05 mm, a hardness of 60 to 62 in HRC, and a density of 7.5 to 7.7 g/cm$^3$ and strongly bonded to the steel base material could be formed without the occurrence of falling of the alloy powder sheet and the shrinkage thereof in the plane directions during the sintering treatment.

While the invention has been described in detail and with reference to specific embodiments thereof, it will be apparent to one skilled in the art that various changes and modifications can be made therein without departing from the spirit and scope thereof.

What is claimed is:

1. A method for sintering a metal powder molding which comprises disposing the metal powder molding which is formed by rolling a mixture of a metal powder and a synthetic resin-based binder, on a metal base material, and sintering the metal powder molding in a non-oxidizing atmosphere, wherein a polyimide liquid composition containing a polyimide precursor and an organic solvent as essential components is interposed between the metal powder molding and the metal base material to adhere and fix the metal powder molding on the metal base material until sintering the meter powder molding wherein said polyimide composition is decomposed upon sintering.

2. The method as claimed in claim 1, wherein the polyimide precursor is a polyamic acid synthesized from an aliphaltic tetracarboxylic dianhydride and an organic diamine, or a polyamic acid-imide formed by partially imidating the polyamic acid.

3. The method as claimed in claim 1, wherein the polyimide precursor is a polyamide acid synthesized from a tetracarboxylic dianhydride and an organic diamine, said tetracarboxylic dianhydride being composed of from about 10 to 90 mole % aliphatic tetracarboxylic dianhydride and from about 90 to 10 mole % aromatic tetracarboxylic dianhydride.

4. The method as claimed in claim 1, wherein the polyimide liquid composition comprising the polyimide precursor and the organic solvent as the essential components further contains an epoxy compound having at least 2 epoxy groups in one molecule in such a ratio that the proportion of the epoxy group becomes 0.3 equivalent or more per 1 equivalent of the acid group (carboxy group) of the polyimide precursor.

* * * * *